(12) United States Patent
Maekawa et al.

(10) Patent No.: US 8,638,511 B2
(45) Date of Patent: Jan. 28, 2014

(54) REFLECTOR ARRAY OPTICAL DEVICE AND DISPLAY DEVICE USING THE SAME

(75) Inventors: Satoshi Maekawa, Koganei (JP); Markon Sandor, Koganei (JP); Takashi Sugiyama, Tokyo (JP)

(73) Assignees: National Institute of Information and Communications Technology, Tokyo (JP); Stanley Electric Co., Ltd., Tokyo (JP)

( * ) Notice: Subject to any disclaimer, the term of this patent is extended or adjusted under 35 U.S.C. 154(b) by 53 days.

(21) Appl. No.: 13/481,558

(22) Filed: May 25, 2012

(65) Prior Publication Data

US 2012/0300310 A1 Nov. 29, 2012

(30) Foreign Application Priority Data

May 25, 2011 (JP) .................................. 2011-116451

(51) Int. Cl.
*G02B 5/04* (2006.01)
(52) U.S. Cl.
USPC .............. 359/834; 359/627; 359/836; 353/81

(58) Field of Classification Search
USPC ............ 359/529–530, 627, 834, 836; 353/81, 353/99; 345/7, 32
See application file for complete search history.

(56) References Cited

U.S. PATENT DOCUMENTS 7,199,932 B2 * 4/2007 Sugiura ........................ 359/625
2006/0087735 A1 * 4/2006 Nilsen et al. ................. 359/530

FOREIGN PATENT DOCUMENTS

JP 2011191404 * 9/2011
WO 2007/116639 A1 10/2007

* cited by examiner

*Primary Examiner* — James Phan
(74) *Attorney, Agent, or Firm* — Kenealy Vaidya LLP

(57) ABSTRACT

A reflector array optical device includes two dihedral corner reflector array optical elements each having a substrate and a plurality of prism bodies arranged regularly on and each protruding from one main surface of the substrate. Each prism body includes at least two sides of orthogonal planes. The two optical elements are adhered so that top faces of the prism bodies are directly confronted respectively so as to make two coplanar planes in which the two orthogonal planes exist respectively.

6 Claims, 9 Drawing Sheets

Fig. 1 1 A
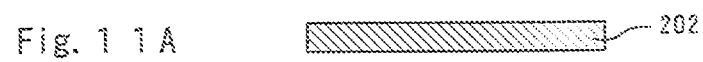
Fig. 1 1 B
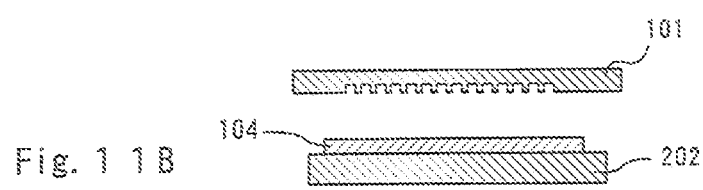
Fig. 1 1 C
Fig. 1 1 D
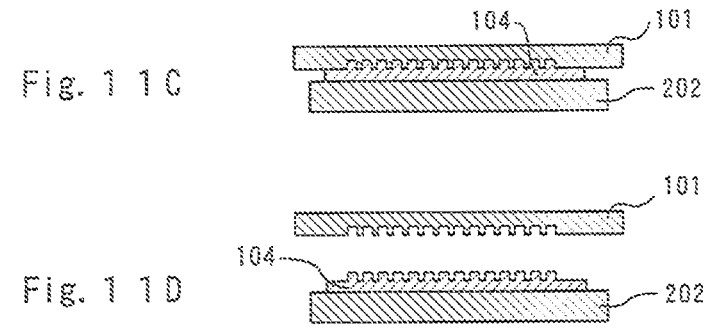
Fig. 1 1 E
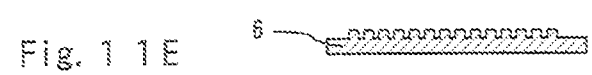

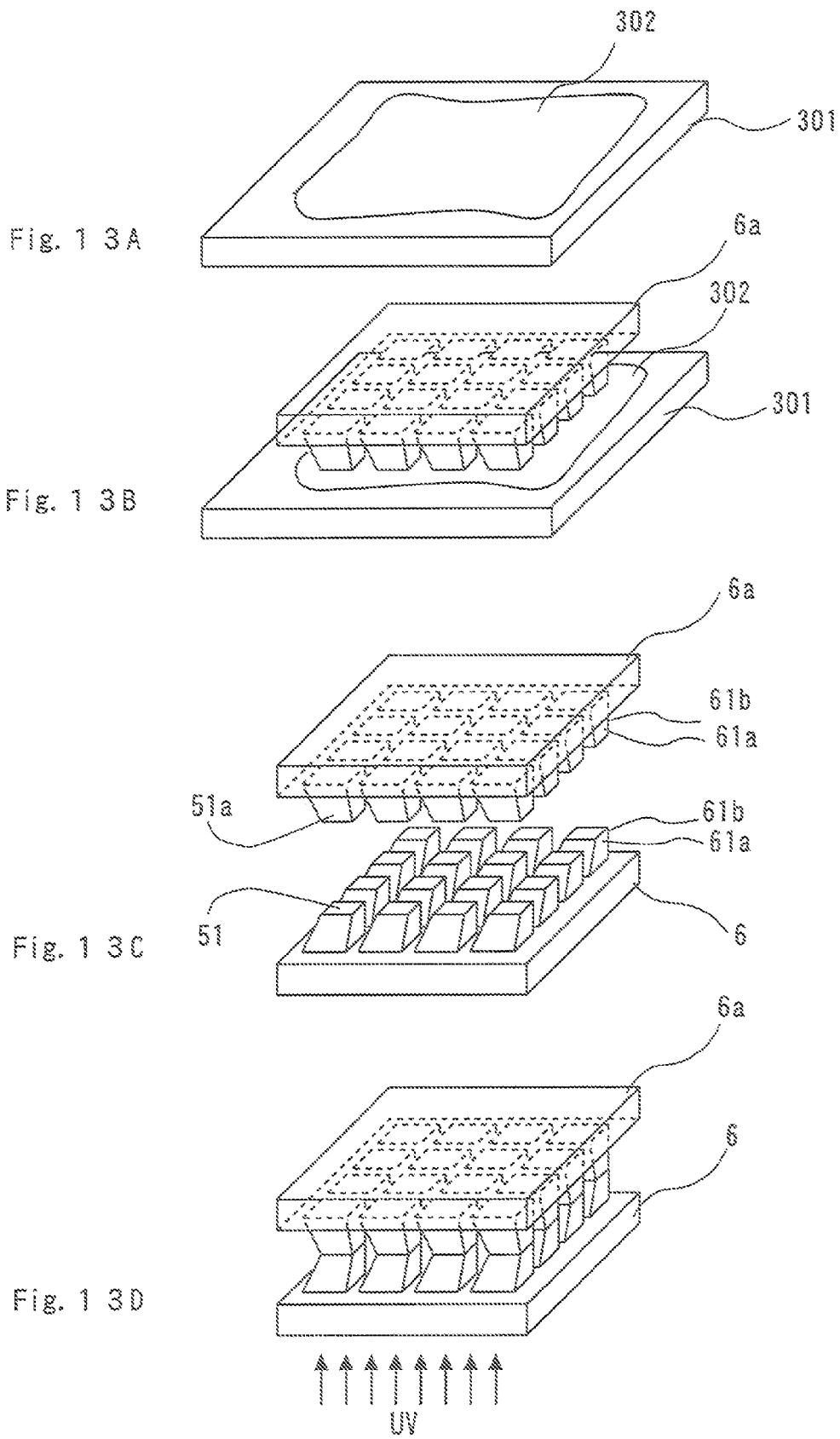

REFLECTOR ARRAY OPTICAL DEVICE AND DISPLAY DEVICE USING THE SAME

This application claims the priority benefit under 35 U.S.C. §119 of Japanese Patent Application No. 2011-116451, filed May 25, 2011, the entire contents of which are incorporated herein by reference.

BACKGROUND

1. Field

The presently disclosed subject matter relates to a reflective real specular image forming element forming a real image (real specular image) of an observed object in a space of a viewer side and, a display device using the same and an optical device using the same.

2. Description of the Related Art

There have been suggested a display device for allowing a viewer to see a real image (real specular image) of an observed object in air by using the reflective real specular image forming element (see Reference 1 below).

Specifically, such a display device using the reflective real specular image forming element comprises a reflective real specular image forming optics being in a space of a viewer side; and an observed object disposed in a space opposite to the viewer side with respect to the reflective real specular image forming optics, where the reflective real specular image forming optics performs the formation of a real image (real specular image) of the observed object at a symmetrical position with respect to a plane of symmetry thereof.

The document Reference 1 explains unit optical elements (each so-called as a dihedral corner reflector) as the reflective real specular image forming optics wherein each of unit optical elements has two orthogonal minor surfaces (reflection surfaces) which are perpendicular to each other. The document Reference 1 discloses a reflective real specular image forming element (so-called a dihedral corner reflector array optical element) in which a plurality of dihedral corner reflectors are arranged regularly on one plane of an element face. The dihedral corner reflector array optical element specifically utilizes respective inner walls of square shaped holes made in a substrate while penetrating the element face as dihedral corner reflectors laid out in a grid pattern. Also, the dihedral corner reflector array optical element utilizes a plurality of transparent cube shape tubular bodies each perpendicularly protruding from the surface of the substrate made of a transparent material wherein inner wall surfaces of each transparent tubular body or prism body are used for the dihedral corner reflector.

In a plurality of the arranged dihedral corner reflector of the dihedral corner reflector array optical element, since each minor surface is disposed perpendicularly to the element face, light (emitted from the observed object existing on the one side of the element face) is reflected twice by the dihedral corner reflector during passing therethrough, and then by all light passed through the element, a real image is formed in a space of observed object absent on the other side of the element face. Namely, the dihedral corner reflector array optical element performs the formation of a real image in such a manner that the real image of the object exists symmetrical to the observed object with respect to the element face (the so-called plane of symmetry) of the dihedral corner reflector array optical element.

Reference 1: WO 2007-116639

There are various differences in the condition of observation in order to obtain the brightest floating image observed by using the dihedral corner reflector array optical elements having square shaped holes and alternatively having the cube prism bodies made of a transparent material such as acrylic resin because the transparent material differs in refractive index from the air.

In the conventional art, there is a characteristic and/or problem that it is hard to form a floating image with brightness sufficient to be distinguishable from background brightness if prism bodies having a low height are formed on the dihedral corner reflector array optical element.

SUMMARY

Therefore, the presently disclosed subject matter has been conceived for, among other reasons, to provide a reflector array optical device and a display device using the same, which are able to improve the brightness of a floating image.

The reflector array optical device according to the presently disclosed subject matter forms a real image of an object existing by one main surface side of the reflector array optical device into the other main surface side thereof, and comprises two dihedral corner reflector array optical elements. Each of the dihedral corner reflector array optical elements comprises a substrate and a plurality of prism bodies arranged regularly on and each protruding from one main surface of the substrate, wherein the prism bodies and the substrate are integrally formed of a transparent material. Each of the prism bodies includes two sides of orthogonal planes that are perpendicular to each other to constitute a dihedral corner reflector perpendicular to the one main surface of the substrate. The two dihedral corner reflector array optical elements are adhered so that top faces of the prism bodies are directly confronted respectively so as to make two coplanar planes in which the two orthogonal planes exist respectively between the substrates of the two dihedral corner reflector array optical elements. By using the particular reflector array optical device, tall prism bodies are attained to improve the brightness of a floating image. The two dihedral corner reflector array optical elements superimposed on one another are effective in forming of the tall prism bodies in comparison with construction of higher prism bodies on a single dihedral corner reflector array optical element.

Further, in accordance with an aspect of the presently disclosed subject matter of the reflector array optical device, each of the prism bodies has a frustum shape comprising: the two orthogonal planes perpendicular to each other and vertical to the one main surface of the substrate; a taper side surface; and a base plane on the substrate whose area is greater than that of the top plane side. In other words, the reflector array optical device of the presently disclosed subject matter is a reflective real specular image forming optics which forms a real image (i.e., real specular image) of the observed object in a space of a viewer side and has a configuration of two dihedral corner reflector array optical elements superimposed on one another each including plural and similar or identical frustums (including dihedral corner reflectors) in which both groups of the frustums are adhered at the top planes respectively so that orthogonal planes (dihedral corner reflector) coinciding exactly form contiguous planes therebetween when superimposed. In each of the two dihedral corner reflector array optical elements, the substrate and the frustums protruding therefrom are integrally formed of a transparent material as one piece. In four side surfaces of the frustum, two orthogonal side planes are formed as the dihedral corner reflector perpendicular to the substrate, and the two side planes other than the two orthogonal sides are formed to have an incline in such a manner that an area of the top plane of the frustum is smaller than that of the base plane (bottom plane) on the substrate side. According to such configuration of the device, a brighter floating image is formed by the reflector array optical device using the dihedral corner reflector array optical element that may be produced by injection molding.

A slant angle can be set within an angle range of 5° or more and 25° or less with respect to a plane (or normal) perpendicular to the substrate of each dihedral corner reflector array optical element in the reflector array optical device. The taper angle of taper portion (i.e., angle with respect the normal line of substrate) is set to be a large value, taking into account parting of the optical element from a stamper. When the taper portion' taper angle value is too large, the top plane's area of the prism body decreases. Thus since the top plane of the prism body have a functions a light exit surface of light reflected by the dihedral corner reflector, a real image (real specular image) of the observed object is darken. Further, even if the area of the top plane is secured for a light real image imaged, when the area of the bottom plane of the prism body increases, then there decreases the number of the dihedral corner reflector per a unit area of the optical element, so that likewise a real image (real specular image) of the observed object is darken.

With respect to such contrary situations, according to our experimentations of injection molding using various taper angles for the prism body, it has been found that the foregoing taper angle (i.e., an angle formed between a taper side surface and a plane perpendicular to the substrate) being within an angle range of 5° or more and 25° or less is suitable.

The two orthogonal planes perpendicular to the substrate can be coated with metal films to function as the dihedral corner reflector of reflective planes in each of the dihedral corner reflector array optical elements of the reflector array optical device.

The dihedral corner reflector array optical elements of the reflector array optical device can be formed respectively by means of injection molding.

When the prism body has a frustum shape, there are two plane sides other than the two sides of the dihedral corner reflector (expect the top plane and the bottom plane), such two plane sides are formed to have the foregoing inclination. Such two plane sides may be formed to have the same taper angle, alternatively to have different taper angles. Provided that the molding die is fabricated by a reversal method such as the electro-forming process, when two plane sides are formed to have the same taper angle, only one kind of a tool bit is required for fabrication. This is convenient.

According to the particular reflector array optical device, there may be realized a display device utilizing a reflective real specular image forming optics which forms a bright real image (real specular image) of the observed object in a space of a viewer side.

According to the particular reflector array optical device of the presently disclosed subject matter, since the two dihedral corner reflector array optical elements having low height prism bodies are superimposed, tall prism bodies are attained therebetween to acquire a bright floating image display. Further it is possible to utilize the dihedral corner reflector array optical element which may be produced by injection molding for the reflector array optical device. In addition, as secondary advantageous effect, the presently disclosed subject matter provides the reduction of passing light to the observer due to multiple reflections.

BRIEF DESCRIPTION OF THE DRAWINGS

The aforementioned aspects and other features of the presently disclosed subject matter are explained in the following description, taken in connection with the accompanying drawing figures wherein:

FIGS. 11A through 11E are partial schematic cross section views illustrating molding dies to explain a hot-pressing process for fabricating a dihedral corner reflector array optical element of an example according to the presently disclosed subject matter;

FIGS. 13A through 13D are schematic perspective views illustrating dihedral corner reflector array optical elements to explain a superimposing process for adhering two dihedral corner reflector array optical elements as an example according to the presently disclosed subject matter;

DETAILED DESCRIPTION

Figure 1:
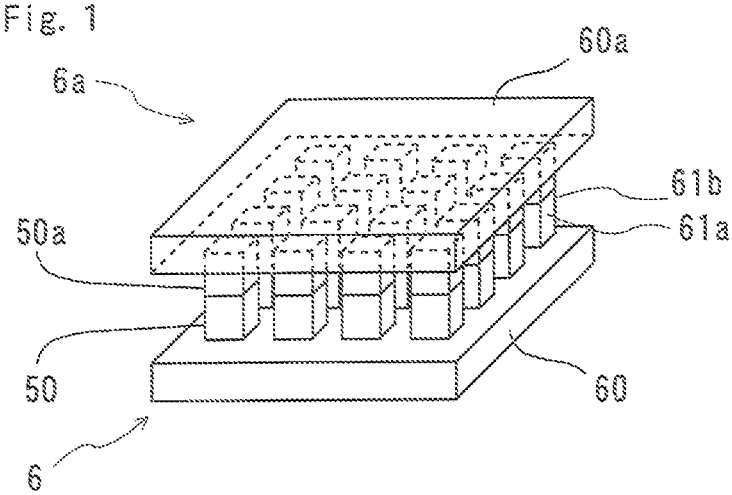
FIG. 1 is an enlarged partial cutaway perspective view illustrating a reflector array optical device of an embodiment according to the presently disclosed subject matter.

A description of embodiments of a dihedral corner reflector array optical element and a method for fabricating the same and a display device using the same according to the presently disclosed subject matter will be described herein below by referring to the drawings.

Figure 2:
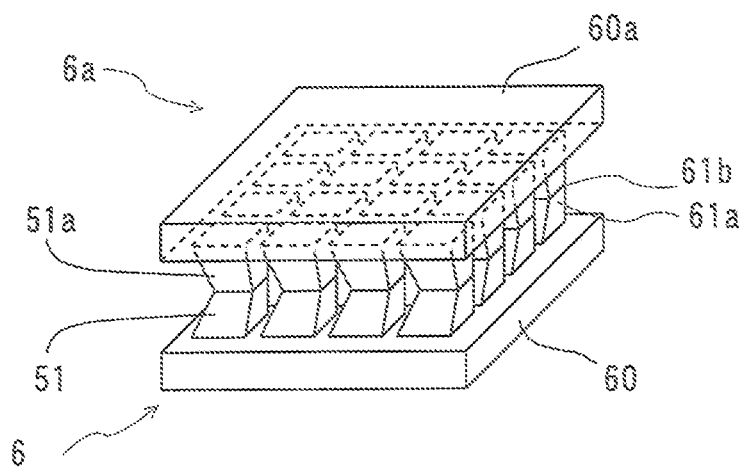
FIG. 2 is an enlarged partial cutaway perspective view illustrating a reflector array optical device of another embodiment according to the presently disclosed subject matter.

FIG. 1 shows an enlarged partial cutaway perspective view of a reflector array optical device of an embodiment according to the presently disclosed subject matter. In FIG. 2, numerals 6 and 6a denote dihedral corner reflector array optical elements, numerals 50 and 50a denote prism bodies, and numerals 60, and 60a denote substrates. Each of two dihedral corner reflector array optical elements 6 and 6a has the substrates 60 and 60a and a plurality of the prism bodies 50 and 50a that are integrally formed thereon and of a transparent material as one piece. The reflector array optical device is configured in such a manner that the two dihedral corner reflector array optical elements 6 and 6a are superimposed so that the prism bodies 50 and 50a are directly confronted respectively.

The two dihedral corner reflector array optical elements 6 and 6a are adhered so that top faces of the prism bodies 50 and 50a are directly confronted respectively so as to make two coplanar planes in which the two orthogonal planes (minor surfaces 61a, 61b) exist respectively between the substrates of the two dihedral corner reflector array optical elements. The reflector array optical device is configured in such a manner that the two dihedral corner reflector array optical elements are confronted one another in which the plural same protrusions of cube are adhered at the top planes thereof respectively so that orthogonal planes, each vertical to the substrate, coinciding exactly form contiguous planes therebetween.

There are methods for forming the dihedral corner reflector array optical elements 6 and 6a having the protrudent prism bodies 50 shown in a FIG. 1, such as an injection molding method and a hot-pressing process each using a transparent martial such as acrylic resin, etc. These methods enables the manufacture of dihedral corner reflector array optical elements 6 and 6a having low height prism bodies 50 of a rectangular parallelepiped shape. Since the protrudent prism bodies 50 have four side surfaces each vertical to the substrate 60, the higher height the prism bodies have, it is harder to part the optical element from a stamper after molding (mold release). Thus the X-ray lithography method may be used for the manufacture of dihedral corner reflector array optical elements to enable to form directly onto a resin substrate surface protrusions of rectangular parallelepiped or cubic shape having four side surfaces each vertical to the resin substrate.

The angle condition of observation to obtain the brightest floating image observed by using the dihedral corner reflector array optical elements having the prism bodies made of acrylic resin or the like is different from that of the optical elements having cubic shaped holes. Namely when a dihedral corner reflector array optical element having cubic shaped holes forms a floating image, the brightest floating image is observed in an angle direction of 35°. In contrast, when a floating image is formed by a dihedral corner reflector array optical element having prism bodies made of acrylic resin each having right rectangular shape which has a height double as large as the side of the square base plane, the further brightest floating image has been observed in comparison with the case of an angle direction of 35°, as a result of a simulation with acrylic resin's refractive index of 1.5, because light rays pass through acrylic resin having the refractive index larger than that of the air. In case such high prism bodies of the optical element are formed by a plastic molding, the higher height the protrusions of right rectangular shape i.e., prism bodies have, the mold release is more difficult after molding.

The addition of a tapered structure, or inclination (i.e., "draft angle") to each protrusion of prism bodies allows easily removing the dihedral corner reflector array optical element from a stamper. However, if each protrusion of prism bodies is provided with a draft angle, then there is reduced in the light efficiency of utilization in the dihedral corner reflector array optical element having the dihedral corner reflectors. For example, in the case of the dihedral corner reflector array optical element having the protrusions each having a rectangular parallelepiped with an inclination, if the protrusion has a height double as large as the side of the square base plane, then the area of the top plane of the protrusion becomes ⅓ as large as the area of the square base plane, so that light rays passing through the top plane are reduced as such decrease in the area.

In view of circumstances above mentioned, there is a limit in the height of the protrusion in the dihedral corner reflector array optical element having the protrusions each having an inclination formed by a plastic molding, concerning a manufacturing aspect, or concerning an optics aspect.

FIG. 2 shows an enlarged partial cutaway perspective view of a reflector array optical device of another embodiment according to the presently disclosed subject matter which canceling the limit of the protrusion height. In FIG. 2, numerals 6 and 6a denote dihedral corner reflector array optical elements, numerals 51 and 51a denote the frustum bodies, and numerals 60 and 60a denote substrates. Each of two dihedral corner reflector array optical elements 6 and 6a has the substrates 60 and 60a and a plurality of frustum bodies 51 and 51a which are integrally formed thereon and of a transparent material as one piece. The reflector array optical device is configured in such a manner that the two dihedral corner reflector array optical elements 6 and 6a are superimposed so that the frustum bodies 51 and 51a are directly confronted respectively.

The two dihedral corner reflector array optical elements 6 and 6a are adhered so that top faces of the frustum bodies 51 and 51a are directly confronted respectively so as to make two coplanar planes in which the two orthogonal planes (minor surfaces 61a, 61b) exist respectively between the substrates of the two dihedral corner reflector array optical elements. The reflector array optical device is configured in such a manner that the two dihedral corner reflector array optical elements are confronted one another in which the plural same protrusions of cube are adhered at the top planes thereof respectively so that orthogonal planes, each vertical to the substrate, coinciding exactly form contiguous planes therebetween. It is possible to use an index matching optical adhesive agent to resin's refractive index for the optical adhesive agent index matching to prevent from light reflection at the adhered surfaces.

Figure 3:
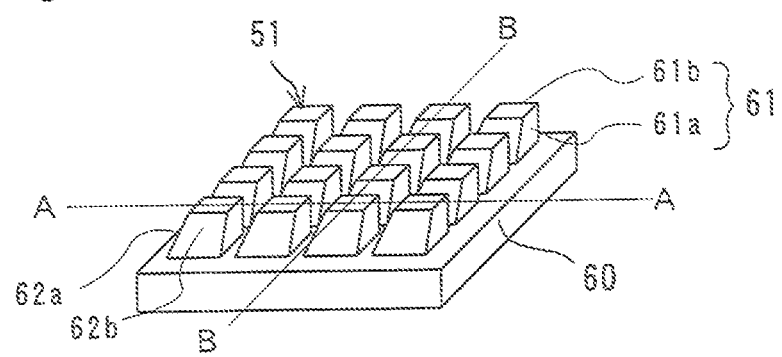
FIG. 3 is an enlarged partial cutaway perspective view illustrating one of dihedral corner reflector array optical elements in the reflector array optical device shown in FIG. 2.
Figure 4A:
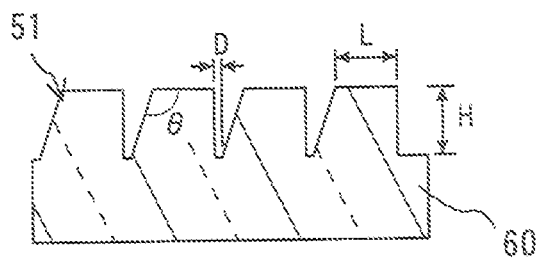
FIG. 4A and FIG. 4B are cross-section views taken off at an A-A line and a B-B line in FIG. 3 respectively.
Figure 4B:
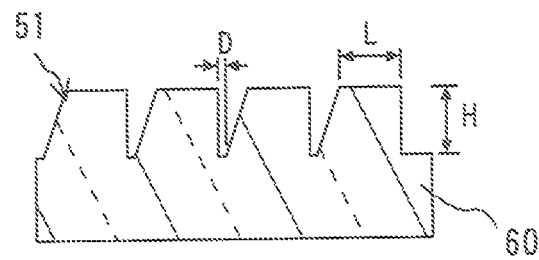
Figure 5:
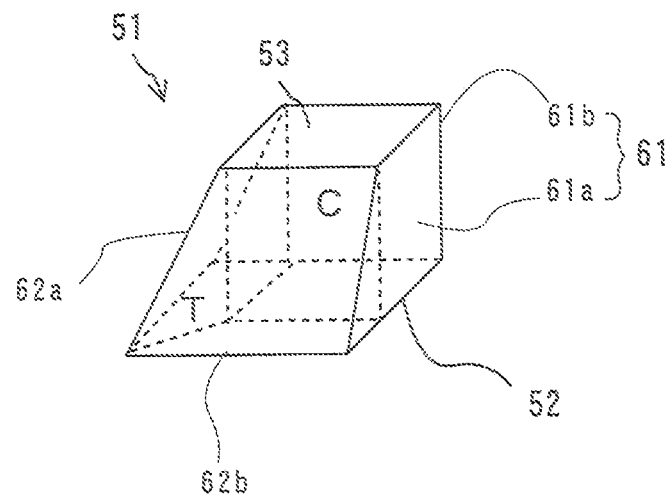
FIG. 5 is an enlarged perspective view illustrating a frustum body of the dihedral corner reflector array optical element.
Figure 6A:
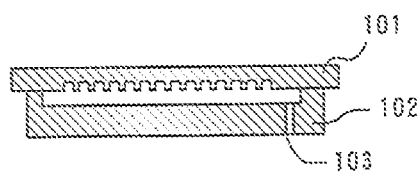
FIG. 6A through 6E are partial schematic cross section views illustrating molding dies to explain a comparative injection molding process for fabricating a dihedral corner reflector array optical element.
Figure 6B:
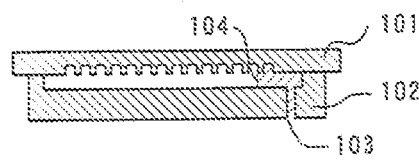
Figure 6C:
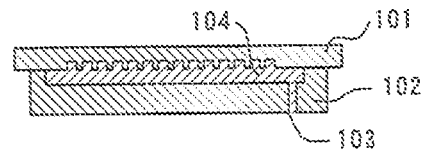
Figure 6D:
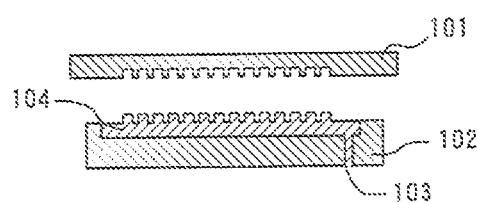
Figure 6E:
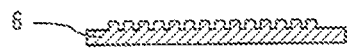

The dihedral corner reflector array optical element 6 having the protrusions each having the frustum shape is explained below since the two dihedral corner reflector array optical elements 6 and 6a are the same. FIG. 3 shows an enlarged partial cutaway perspective view illustrating the dihedral corner reflector array optical element 6 having protruding frustum bodies 51, i.e., the element is a half of the reflector array optical device. Further, FIG. 4A and FIG. 4B are cross-section views taken off at an A-A line and a B-B line shown in FIG. 3 respectively. FIG. 5 shows a schematic perspective view illustrating one the frustum 51 of the dihedral corner reflector array optical element.

The dihedral corner reflector array optical element 6 shown in FIG. 3 comprises a substrate 60 of a flat board and a plurality of frustum bodies 51 which are integrally formed of a transparent material wherein frustum bodies protrude from a base plane of the substrate. On each frustum body, two orthogonal plane sides (mirror surfaces 61a and 61b) are formed to be perpendicular to each other to be a dihedral corner reflector 61 at a line of intersection CL thereof. Plane sides 62a and 62b (other than two minor surfaces of the dihedral corner reflector) of the frustum body have some bearings (inclination) with respect to a normal line of the substrate 60. FIG. 4 shows the measure of the frustum body 51, a height H, a side length of the top plane L, an interval D, and an angle θ (i.e., inclination angle with respect to the top plane), for one example, the height H=170 μm, the side length of a square L=150 μm, the interval D=10 μm, the inclination angle θ=108° as typical values, but the measure of the frustum body is not by these values.

As shown in FIG. 5, the sides 62a and 62b being non-parallel to the dihedral corner reflector belong to taper portions of a frustum body with a truncated pyramid shape 51 which has an area of the top plane 53 smaller than that of the base plane 52 (the bottom plane) of the substrate side. The sides 62a and 62b being non-parallel to the dihedral corner reflector are taper faces. A taper angle of each taper face (i.e., an angle formed between the taper face and a plane perpendicular to the substrate) can be set to be an angle within range of 5° or more and 25° or less is suitable. When the taper angle is less than 5°, then the parting of dies is difficult. When the taper angle is more than 25°, then the frustum body density decreases thereby to reduce luminous flux for the formation of real image.

As shown in FIG. 4, the frustum body 5 has the truncated pyramid shape which is composed of a rectangular parallelepiped portion C (e.g., a cube) including the orthogonal plane sides 61a and 61b and a taper portion T having plane sides 62a and 62b being non-parallel to the orthogonal plane sides wherein the rectangular parallelepiped portion C and the taper portion T are integrated as one piece protrusion.

Specifically, there is described an example of an injection molding method for fabricating a dihedral corner reflector array optical element comprising the substrate and the frustum body.

As shown in FIG. 21A, the stamper 101 and the second molding die 102 are clamped to be contact directly with each other, and then theses are heated up to a temperature of higher than a softening temperature of a resin to be injected (for example 200° C. for use of acrylic resin).

As shown in FIG. 21B, a molten resin 104 is injected through a molding die gate portion 103 into a cavity between the stamper 101 and the second molding die 102 with a high pressure.

As shown in FIG. 21C, after injection of the resin 104, the stamper 101 and the second molding die 102 directly contacted with each other are cooled to a temperature lower than the softening temperature of the resin 104 (for example 80° C. for acrylic resin).

As shown in FIG. 21D, the second molding die 102 and the stamper 101 are parted from each other.

As shown in FIG. 21E, the molded optical element 6 is removed from the second molding die 102. Since the dihedral corner reflector array optical element has the flat face on the molding die side, such removing is easily done comparatively. When resin portions remaining in the gate portion are cut from the molded then the dihedral corner reflector array optical element completed.

There is described briefly the machining process using a tool bit of diamond and the electro-forming process to form a predetermined stamper with a reversal shape as follows.

Figure 7:
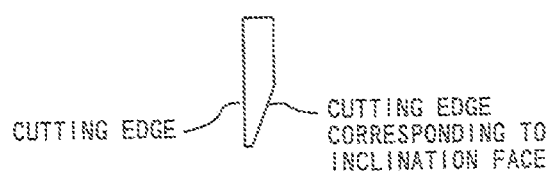
FIG. 7 is a schematic cross section view illustrating a tool bit of diamond used in manufacture of a stamper used in the method for fabricating a dihedral corner reflector array optical element according to the presently disclosed subject matter.

First, in a preparatory step, a tool bit of diamond (blade for cutting) is provided which has a one side of vertical cutting edge face and the other side of cutting edge face corresponding to the inclination face of the frustum body, as shown in FIG. 7.

Figure 8:
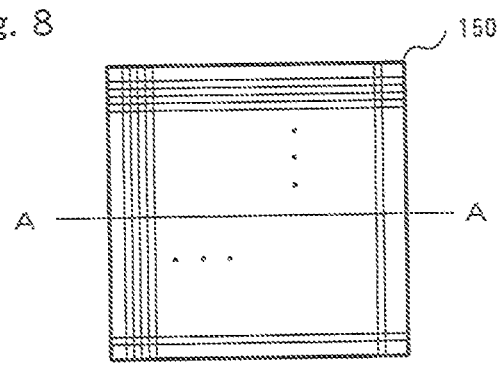
FIG. 8 is a schematic plan view illustrating a copper master plate after the machining process.
Figure 9:
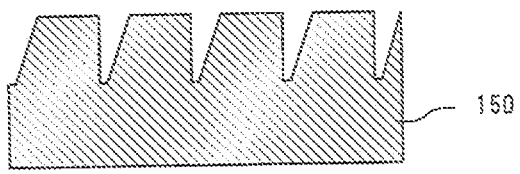
FIG. 9 is an enlarged cross-section view partially taken off at an A-A line in FIG. 8.

Then, for example, a copper master plate shown in FIG. 8 of a square place having a predetermined thickness is provided. Through the machining process, using the tool bit of diamond of FIG. 7, the copper master plate is machined to have a reversal shape corresponding to the dihedral corner reflector array optical element. Specifically, parallel grooves are cut with a predetermined pitch parallel to one side of square of the copper master plate sequentially. Then, vertical grooves are cut with the predetermined pitch perpendicular to the preceding cut grooves sequentially. For the cutting of the frustum body t having the cross-section shown in FIG. 4, the repetition of digging for one groove to a 5 μm depth per one stroke is preformed up to the sum 170 μm depth, and then the tool bit of diamond is shifted to a next line position at the predetermined pitch, and then those steps are repeated. FIG. 9 shows a schematic enlarged partial cross section view illustrating such the copper master plate 150.

Figure 10:
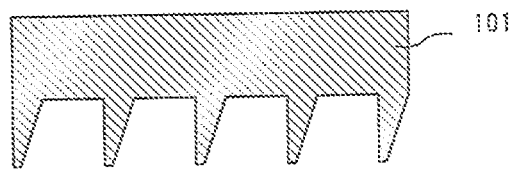
FIG. 10 is an enlarged partial schematic cross section view illustrating a stamper obtained through an electro-forming process.

Then, after the machining process, the electro-forming process of nickel plating is performed using the copper master plate, so that nickel stamper 101 of the molding die having a reversal shape of the copper master plate with the frustum bodies being the same as the dihedral corner reflector array optical element. FIG. 10 shows a schematic enlarged partial cross section view illustrating the resulted stamper 101 from the electro-forming process.

By using the stamper 101 in a hot-pressing process, also the dihedral corner reflector array optical element may be formed.

A procedure for forming a dihedral corner reflector array optical element using the hot-pressing process is as follows.

As shown in FIG. 11A, a stamper 101 and a metal mold 202 are provided and then theses are heated up to a temperature of higher than a softening temperature of a resin 104 to be used (for example 200° C. for use of acrylic resin).

As shown in FIG. 11B, a resin sheet 104 to be used is put on the metal mold 202.

As shown in FIG. 11C, the stamper 101 is pressed onto the resin sheet 104 on the metal mold 202 (pressurization). Keep pressing the resin sheet, the stamper 101 and the metal mold 202 are cooled to a temperature lower than the softening temperature of the resin sheet 104 (for example 80° C. for acrylic resin).

As shown in FIG. 11D, the stamper 101 is parted from the resin sheet 104 and the metal mold 202. At this timing, it is possible to use the vacuum adsorption and so on for chucking the casting of a dihedral corner reflector array optical element 6 on the metal mold 202 to facilitate release of the stamper 101 from the molded dihedral corner reflector array optical element and the metal mold 202.

As shown in FIG. 11E, the molded dihedral corner reflector array optical element 6 is parted from the metal mold 202. Such a mold release is comparatively easy since the dihedral corner reflector array optical element has a flat surface at the metal mold side.

In addition to use the resin sheet as mentioned above, a resin mass is provided on the metal mold 202 heated up to be melt so as to be a resin sheet 104 and then the foregoing hot-pressing process may be performed.

By using the process as described above, plastic molding for the dihedral corner reflector array optical element 6 having the frustum bodies 51 each having a tapered shape is performed with comparative ease.

Figure 12A:
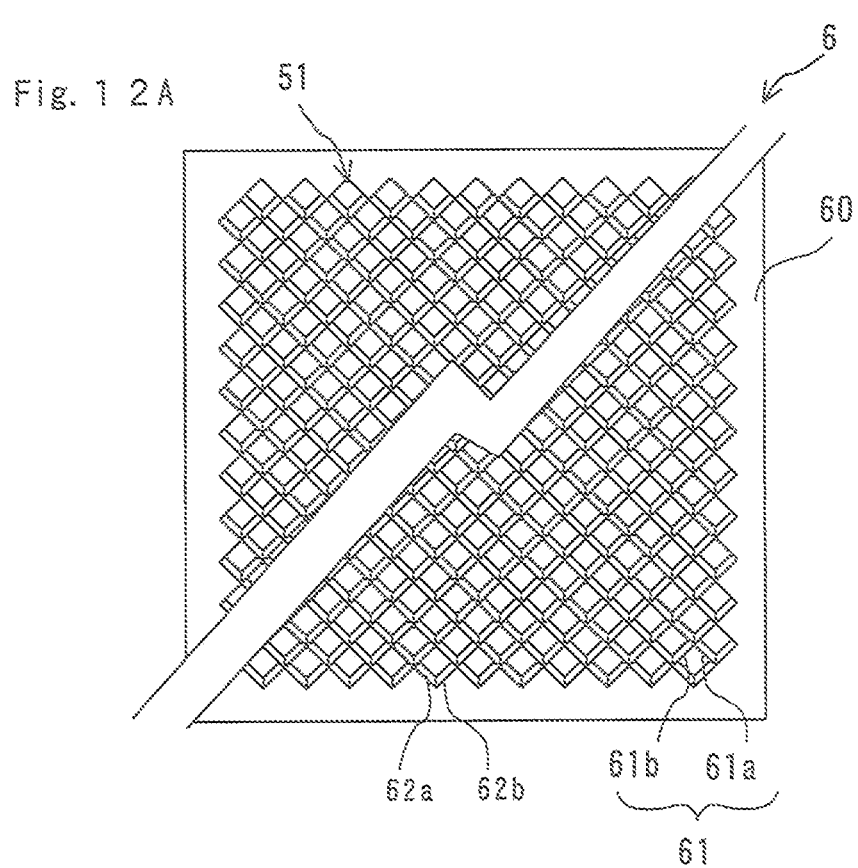
FIG. 12A is a partial cutaway plan view illustrating a specific example of a dihedral corner reflector array optical element applied to a display device according to the presently disclosed subject matter.
Figure 12B:
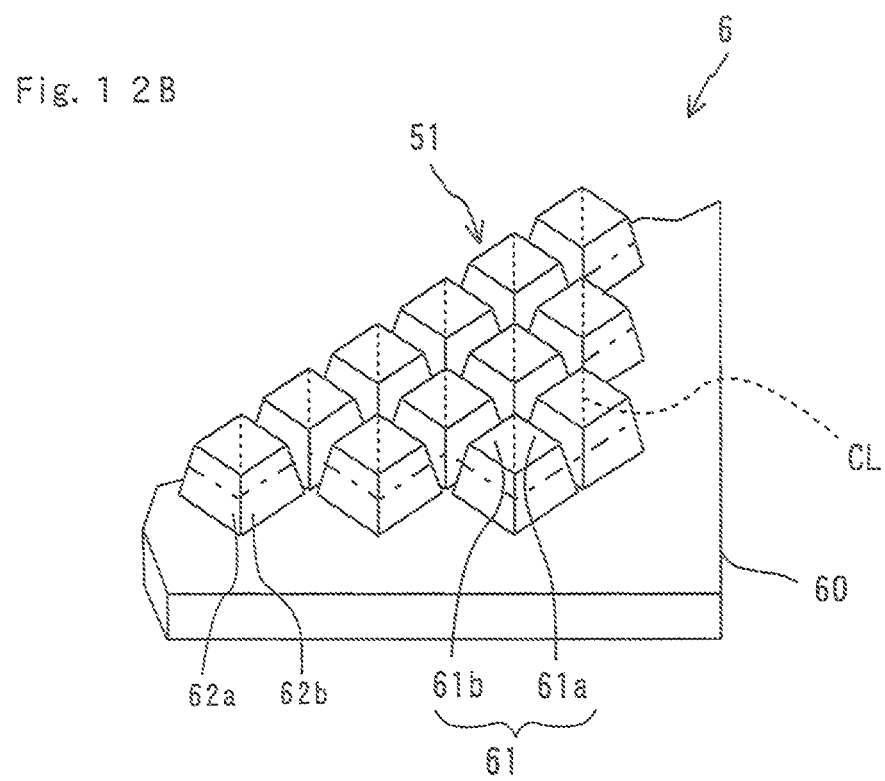
FIG. 12B is an enlarged partial cutaway perspective view illustrating the dihedral corner reflector array optical element.

According to the presently disclosed subject matter, as shown in FIG. 12A, the dihedral corner reflector array optical element 6 is realized which comprises the transparent substrate 60 of a thin plate; and a plurality of transparent frustum bodies 51 formed thereon, wherein each frustum body 51 has a truncated pyramid shape (e.g., a square bottom plane, 50 μm-200 μm per side) in the frontal view so that light passes through and between the base plane (bottom plane) and the top face, i.e., top plane of the frustum body 51, wherein each frustum body 51 has two orthogonal plane sides 61a and 61b used as the dihedral corner reflector 61. It may be configurable that some of the tapered surfaces that are not to form the dihedral corner reflectors 61 be subjected to no mirror finishing so that they will be made non-reflective or matte. The dihedral corner reflectors 61 can also be arranged on regularly aligned lattice points so that the internal angles defined by the mirror surfaces 61a and 61b will be all positioned in the same direction on the substrate 60. Accordingly, a line of intersection CL of the orthogonal mirror surfaces 61a and 61b of each of the dihedral corner reflectors 61 can be orthogonal to the element surface 6S as shown in FIG. 12B. In the below, the direction of the internal angle defined by the minor surfaces 61a and 61b is called the orientation (direction) of the dihedral corner reflector 61. In addition, metal reflective films may be formed on the outer plane sides (inner wall plane sides 61a and 61b) of the frustum body 51 functioning as dihedral corner reflectors, so that the reflective efficiency the dihedral corner reflector is improved.

Next, a procedure for superimposing two dihedral corner reflector array optical elements is described referring to FIGS. 13A-13D.

As shown in FIG. 13A, an optical adhesive agent 302 of ultraviolet curing type is spread widely on a glass substrate 301 of a flat plate using a bar coater device or the like.

The TB3042B available from ThreeBond Co., Ltd may be used for the optical adhesive agent.

As shown in FIG. 13B, one of dihedral corner reflector array optical element 6a is put on the glass substrate 301 in such a manner that a part of the optical adhesive agent 302 of the substrate is transferred onto the top planes of the frustum bodies 51 of the element.

As shown in FIG. 13C, the dihedral corner reflector array optical element 6a is confronted with the other of the dihedral corner reflector array optical element 6 and then both are superimposed each other via the optical adhesive agent such a manner that the top planes of the frustum bodies 51a, 51b coincide exactly, and also the two orthogonal sides (minor surfaces 61a, 61b) perpendicular to the substrates 60 and 60a coincide exactly so as to form contiguous planes therebetween, that is, as joined surfaces 61a, 61b function as the dihedral corner reflector respectively, while adjusting the position of the elements to align the surfaces 61a, 61b. By this way, the two dihedral corner reflector array optical element 60 and 60a are adhered to each other at the top planes of the frustum bodies 51 and 51a so as to make two coplanar planes in which the two orthogonal planes exist respectively between the substrates of the two elements.

As shown in FIG. 13D, UV light of ultraviolet is irradiated onto the substrate of one of the dihedral corner reflector array optical elements 6, so that the optical adhesive agent is hardened.

Figure 14:
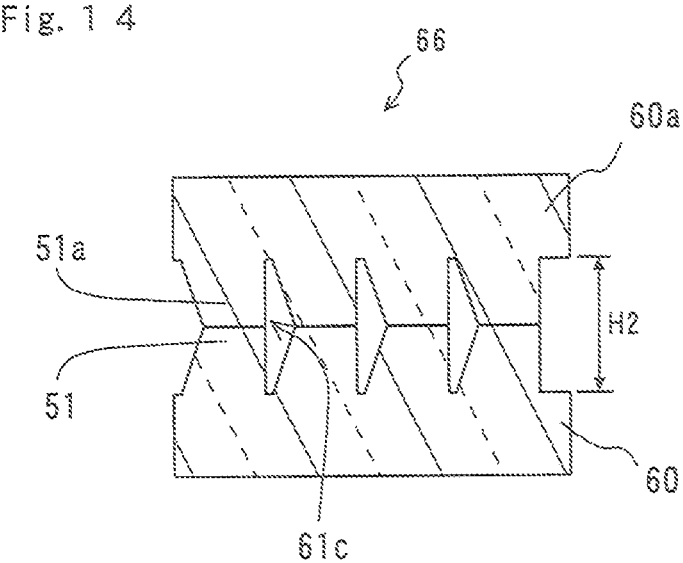
FIG. 14 is a partially cut-off cross-section view schematically showing a joined state of frustum shape protrusions in the reflector array optical device.

FIG. 14 shows a partially cut-off cross-section view of the fabricated reflector array optical device 66 in which the respective frustum bodies 51 and 51a are integrated via the adhesives. Slip reflecting surfaces 61c of the dihedral corner reflectors each extending in the thickness direction of the optical device are formed with the two orthogonal planes between the substrates 60 and 60a, because the two elements are superimposed each other so that adjoining two planes of the two orthogonal planes orthogonal planes between the substrates vertical thereto contiguously exist respectively so as to function as the dihedral corner reflector. When there were superimposed the dihedral corner reflector array optical elements having protrudent frustums each having a square base plane and a height equal to a side of the square base plane (H=170 μm), slip reflecting surfaces 61c of the reflector array optical device were obtained which have a height at double as large as the side of the square base plane (H2=340 μm). As a result from the foregoing simulation, the reflector array optical device was attained which satisfied the condition to exhibit the brightest floating image observed in an angle direction of 35°.

When the reflector array optical device having the two orthogonal planes coated with metal reflective films was fabricated, an influence of the squeezed-out optical adhesive agent was canceled with advantage. In an extreme case that a space among metal reflective films was filled with the adhesive agent to exclude the air space among the frustum bodies, namely, the frustum bodies was aligned without gap, the brighter floating image was observed with the reflector array optical device.

Although the dihedral corner reflector array optical elements were adhered with the optical adhesive agent in the foregoing example, another optical adhesive material (e.g., SEKISUI high transparent double-stick tape #5511 available from SEKISUI CHEMICAL CO., LTD.).

In addition to these optical adhesive agent and optical adhesive material (stick tape) for bonding, the dihedral corner reflector array optical elements may be superimposed by means of clamp fixing, screw fixing, clip fixing and the like or welding fixation with heat. In these cases, the brighter floating image was observed with the reflector array optical device.

The reflector array optical device has bent side surfaces at the middle thereof other than the dihedral corner reflector in each jointed frustum, that is, column structure defined by four sides and the substrate side faces which has a concave portion at the middle thereof. This concave portion does not influence the brightness of a floating image because the dihedral corner reflector reflects light once per each reflecting surface thereof and this reflect light ray passes near the slip reflecting surfaces 61c (vertical surfaces).

Figure 15:
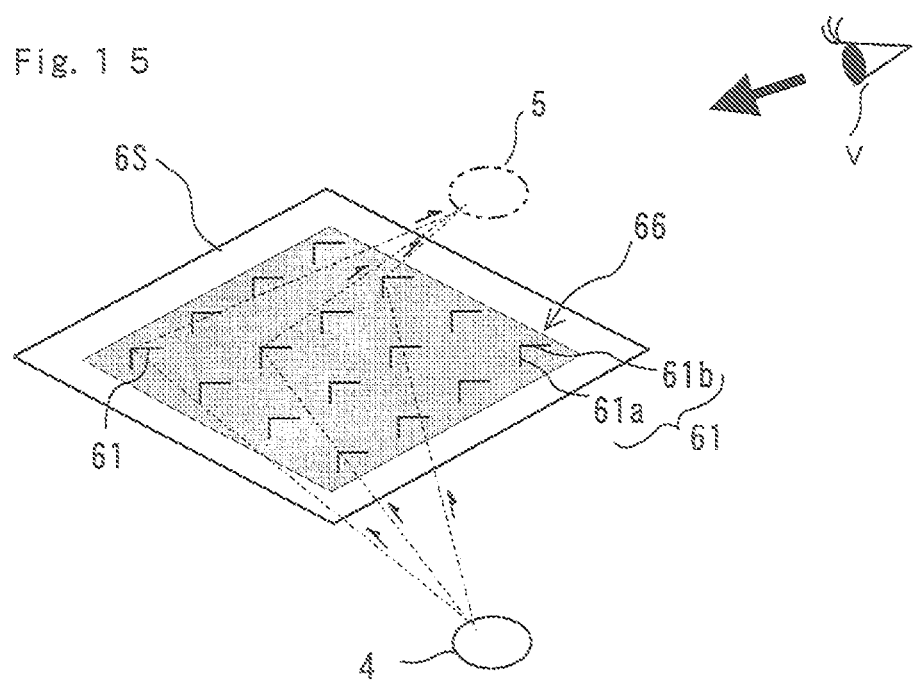
FIG. 15 is a schematic perspective view illustrating how a real image is formed by a dihedral corner reflector array according to the presently disclosed subject matter.

As is schematically shown in FIG. 15, a reflector array optical device 66 according to the presently disclosed subject matter comprises: a dihedral corner reflector array optical element and an observed object 4 disposed by one surface side of the substrate, wherein the dihedral corner reflector array optical element forms a real image 5 (real specular image) of the object by the other surface side of the substrate. The reflector array optical device 66 is constructed of a large number of dihedral corner reflectors 61 each having two orthogonal mirror surfaces 61a and 61b (which belongs to the slip reflecting surfaces 61c), in which flat surface substantially orthogonal to the two mirror surfaces 61a and 61b of each of the dihedral corner reflectors 61 is defined as an element surface 6S (which belongs to the top planes of the frustums in the adhered dihedral corner reflector array optical element). The real specular image 5 of the object 4 is formed at a position plane-symmetrical to the object 4 with respect to the element surface 6S. In the present embodiment, the dihedral corner reflectors 61 are considerably small (on the order of micrometers) compared to the entire size (on the order of centimeters) of the reflector array optical device 66. In FIG. 15, an aggregate of the dihedral corner reflectors 61 is shown in gray and a dihedral angle defined by the minor surfaces are indicated by V shapes as showing an orientation of the interior corners thereof, so that the dihedral corner reflectors 61 are exaggeratedly shown in the figure.

In the reflector array optical device 66 of the presently disclosed subject matter, plain sides of the protruding frustum body are formed to be perpendicular to the substrate (61a, 61b in FIG. 24) expect inclined plane sides of the feature of the presently disclosed subject matter.

In each of the dihedral corner reflectors 61 constituting the reflector array optical device 66, light rays entering the corresponding hole via the rear side (object-side space) are reflected by one minor surface 61a (or 61b). The reflected light ray is further reflected by the other minor surface 61b (or 61a), and is then caused to pass through the dihedral corner reflector 61 via the front side (viewer-side space) so that each dihedral corner reflector has a so-called twice reflection function. A path along which each light ray enters the dihedral corner reflector 61 and a path along which the light ray exits the dihedral corner reflector 61 are plane-symmetrical to each other with respect to the element surface 6S. Specifically, assuming that the element surface 6S is a surface passing the central portion of the height of each minor surface and orthogonal to each mirror surface, the element surface 6S is a plane of symmetry with respect to which the position of the real image formed as a floating image, i.e., real specular image 5 of the object 4 is plane-symmetrical to the object 4.

Figure 16:
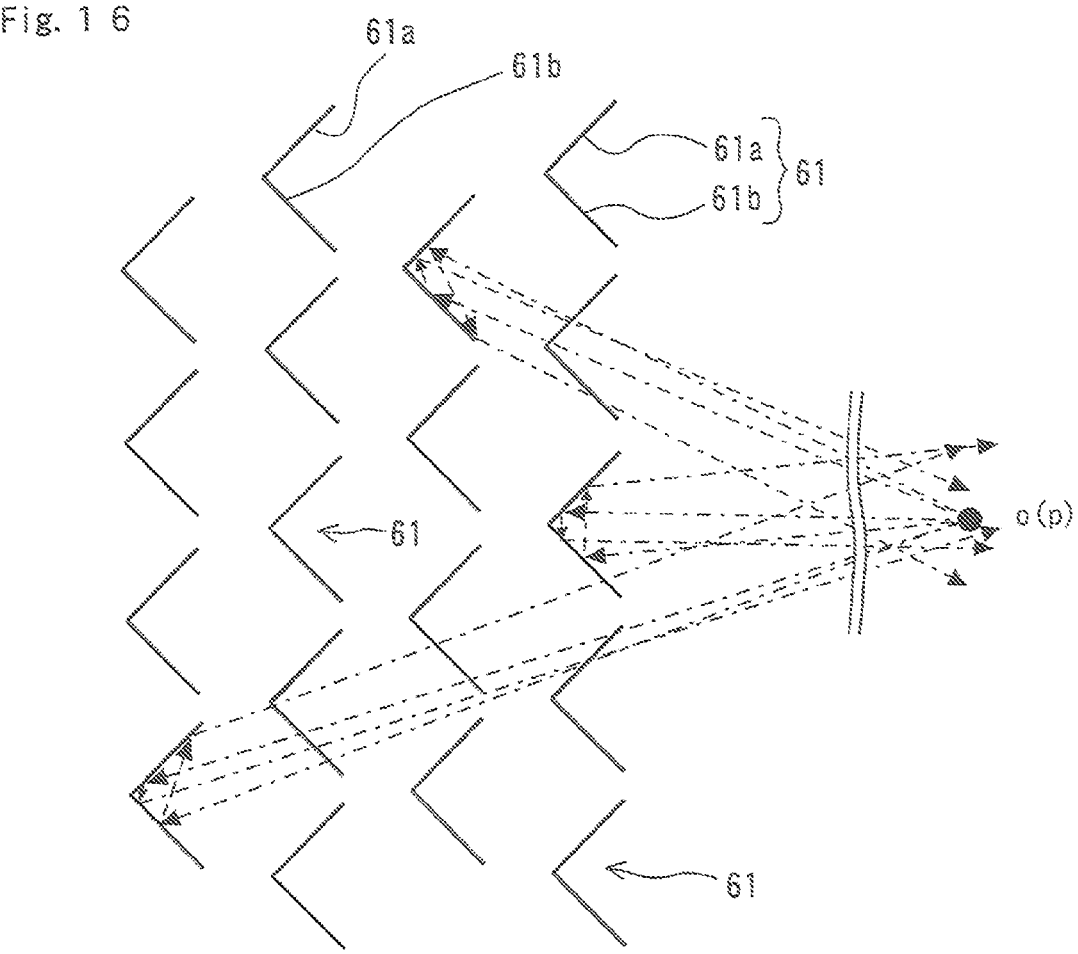
FIG. 16 is a schematic plan view illustrating how a real image is formed by the dihedral corner reflector array optical element applied to the display device according to the presently disclosed subject matter.
Figure 17:
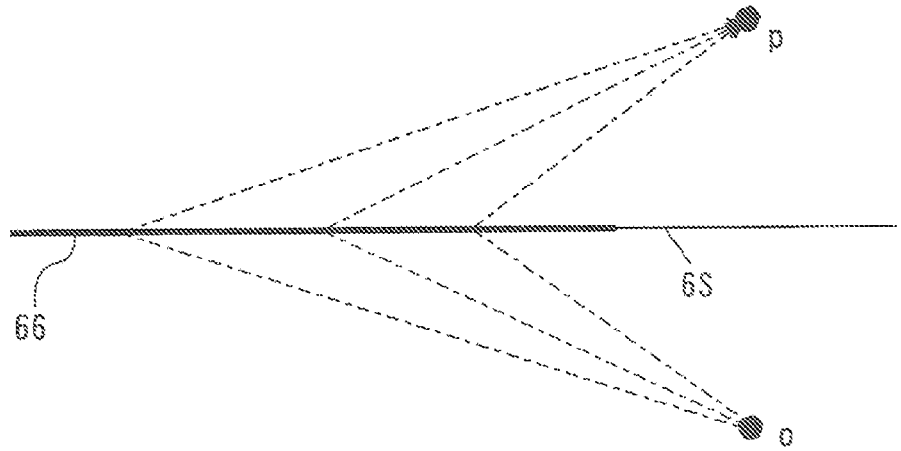
FIG. 17 is a schematic side view illustrating how a real image is formed by the dihedral corner reflector array optical element applied to the display device according to the presently disclosed subject matter.

Briefly described next together with a path of each light ray emitted from a point light source (o) as an observed object is how an image is formed by the reflector array optical device 66. FIG. 16 is a schematic plan view of the reflector array optical device 66, and FIG. 17 is a schematic cross-section view of part of the reflector array optical device 66. In FIG. 16, the dihedral corner reflectors 61 and the mirror surfaces 61a, 61b are shown to be quite exaggerated in comparison to the entirety of the reflector array optical device 66. As is shown in FIGS. 16 and 17, when passing through the reflector array optical device 66, light rays emitted from the point light source (o) (indicated by one-dot arrowed chain lines traveling from the back toward the front on the drawing when viewed three-dimensionally in FIG. 16) are each reflected once by one mirror surface 61a (or 61b), and is reflected further by the other mirror surface 61b (or 61a) of each of the dihedral corner reflectors 61. Next, the reflected light rays pass through the element surface 6S, and then pass in dispersion a point that is plane-symmetrical to the point light source (o) with respect to the element surface 6S of the reflector array optical device 66. Incoming light rays and reflected light rays are shown to be parallel in FIG. 16. The reason therefore is as follows. In FIG. 16, the dihedral corner reflectors 61 are shown to be exaggeratedly large in comparison to the point light source (o). However, the actual size of the dihedral corner reflectors 61 is considerably small. Accordingly, incoming light rays and reflected light rays nearly overlap each other when the reflector array optical device 66 is viewed from above. (In FIG. 16, paths of light rays that first fall on both of the two minor surfaces (61a, 61), namely, two paths, of each of the dihedral corner reflectors 61 are shown. In FIG. 17, only one light ray that first falls on either of the mirror surfaces is shown in order to avoid complication.) In summary, light rays converge to a position plane-symmetrical to the point light source (o) with respect to the element surface 6S, so that a real image is formed at a position (p) shown in FIGS. 16 and 17.

As described above, it is possible to provide reflective films such as metal films on the orthogonal plane sides of the frustum body functioning as dihedral corner reflectors. The inventors have found that the forming of reflective films may be omitted, and a product as resin-molded of the optical element, i.e., a dihedral corner reflector array optical element without any reflective film has performed the formation of real image with a sufficient light flex in practice because there is obtained a sufficient difference in refraction index between the resin and the air.

Since a product as resin-molded of the optical element, i.e., a dihedral corner reflector array optical element without any reflective film is usable; the presently disclosed subject matter therefore provides a low cost display device for allowing a viewer to see a real image (real specular image) of an observed object in air. Further the dihedral corner reflectors are coated with metal films in individual states of dihedral corner reflector array optical elements before assembling into the reflector array optical device, and alternatively the joined dihedral corner reflectors are coated with metal films after dihedral corner reflector array optical elements is adhered as the reflector array optical device.

It is understood that the foregoing description and accompanying drawings set forth certain exemplary embodiments of the presently disclosed subject matter at the present time. Various modifications, additions and alternative designs will, of course, become apparent to those skilled in the art in light of the foregoing teachings without departing from the spirit and scope of the disclosed presently disclosed subject matter. Thus, it should be appreciated that the presently disclosed subject matter is not limited to the disclosed embodiments but may be practiced within the full scope of the appended claims.

What is claimed is:

1. A reflector array optical device comprising:
two dihedral corner reflector array optical elements each being composed of
a substrate and
a plurality of prism bodies arranged regularly on and each protruding from one main surface of the substrate, wherein the prism bodies and the substrate are integrally formed of a transparent material, each of the prism bodies including two sides of orthogonal planes which are perpendicular to each other to constitute a dihedral corner reflector perpendicular to the one main surface of the substrate,
wherein the two dihedral corner reflector array optical elements are adhered so that top faces of the prism bodies are directly confronted respectively so as to make two coplanar planes in which the two orthogonal planes exist respectively between the substrates of the two dihedral corner reflector array optical elements.

2. The reflector array optical device according to claim 1, wherein each of the prism bodies has a frustum shape having a taper side surface and a base plane on the substrate whose area is greater than that of the top plane side.

3. The reflector array optical device according to claim 2, wherein the taper side surface is inclined from a normal line to the substrate within an angle range of 5° or more and 25° or less.

4. The reflector array optical device according to claim 1, further comprising minor metal reflective films coated on the two orthogonal planes of each prism body respectively.

5. The reflector array optical device according to claim 1, wherein the dihedral corner reflector array optical elements are formed respectively by means of injection molding.

6. A display device including the reflector array optical device according to claim 1, wherein an observed object exists by one main surface side of the reflector array optical device, and the reflector array optical device is configured to form a real image of the object by the other main surface side of the reflector array optical device.

* * * * *